(12) United States Patent
Nishizawa et al.

(10) Patent No.: US 10,443,670 B2
(45) Date of Patent: Oct. 15, 2019

(54) DAMPING DEVICE

(71) Applicant: NHK INTERNATIONAL CORPORATION, Novi, MI (US)

(72) Inventors: Shinichi Nishizawa, Walled Lake, MI (US); Norifumi Momoi, Northville, MI (US); Liwen Lee, Farmington Hills, MI (US); Jeff Butts, Ferndale, MI (US); Fang Dai, Novi, MI (US)

(73) Assignee: NHK INTERNATIONAL CORPORATION, Novi, MI (US)

( * ) Notice: Subject to any disclaimer, the term of this patent is extended or adjusted under 35 U.S.C. 154(b) by 0 days.

(21) Appl. No.: 15/911,609

(22) Filed: Mar. 5, 2018

(65) Prior Publication Data

US 2019/0271370 A1   Sep. 5, 2019

(51) Int. Cl.
*F16F 15/02* (2006.01)
*F16F 7/116* (2006.01)
(Continued)

(52) U.S. Cl.
CPC .............. *F16F 7/116* (2013.01); *B60N 2/64* (2013.01); *B60N 2/90* (2018.02); *F16F 2222/08* (2013.01);
(Continued)

(58) Field of Classification Search
CPC ........... F16F 1/12; F16F 15/02; B23B 29/022; B23B 27/002; B23B 27/007
(Continued)

(56) References Cited

U.S. PATENT DOCUMENTS 2,960,189 A * 11/1960 Osburn .............. B23Q 17/0976
181/207
3,774,730 A * 11/1973 Maddux .............. B23B 29/022
188/379
(Continued)

FOREIGN PATENT DOCUMENTS

DE  29908839 U1  8/1999
JP  63111337 U   7/1988
(Continued)

OTHER PUBLICATIONS

Extended European Search Report (EESR) dated Aug. 7, 2019 issued in European Application No. 19159704.6.

*Primary Examiner* — Christopher P Schwartz
(74) *Attorney, Agent, or Firm* — Holtz, Holtz & Volek PC

(57) ABSTRACT

A damping device according to one embodiment includes a base member fixed to a vibration suppression target, a first coil spring, a second coil spring, and a weight member. The first coil spring includes a first fixed-side end turn portion supported on a first support portion of the base member, a first effective portion, and a first movable-side end turn portion. The second coil spring includes a second fixed-side end turn portion supported on a second support portion of the base member, a second effective portion, and a second movable-side end turn portion. Each of the first coil spring and the second coil spring is deflected in a longitudinal direction along the axis, and a transverse direction perpendicular to the axis. The weight member is arranged between the first coil spring and the second coil spring, and moves in the longitudinal direction and the transverse direction.

11 Claims, 10 Drawing Sheets

(51) Int. Cl.
    *B60N 2/64*     (2006.01)
    *B60N 2/90*     (2018.01)
    *F16F 1/12*     (2006.01)

(52) U.S. Cl.
    CPC ............... *F16F 2224/0208* (2013.01); *F16F 2230/0005* (2013.01)

(58) Field of Classification Search
    USPC .................. 188/379, 380; 267/136, 166–179
    See application file for complete search history.

(56) References Cited

U.S. PATENT DOCUMENTS

| | | | | |
|---|---|---|---|---|
| 4,238,104 A | * | 12/1980 | Hamilton | F16F 3/10 188/380 |
| 4,550,812 A | * | 11/1985 | Mard | B64C 27/001 188/379 |
| 4,925,198 A | | 5/1990 | Ito et al. | |
| 5,379,990 A | * | 1/1995 | Ando | F16F 9/103 267/136 |
| 5,816,373 A | * | 10/1998 | Osterberg | F16F 7/1017 188/380 |
| 6,009,985 A | * | 1/2000 | Ivers | F16F 7/1005 188/380 |
| 6,481,701 B2 | * | 11/2002 | Kessen | B60G 15/062 267/166 |
| 6,614,747 B2 | * | 9/2003 | Imai | G11B 33/08 720/693 |
| 7,586,236 B2 | * | 9/2009 | Corsaro | F16F 15/005 310/322 |
| 9,108,750 B2 | * | 8/2015 | Camarasa | B64G 1/283 |
| 9,457,635 B2 | * | 10/2016 | Pepka | F16F 6/005 |
| 2008/0211151 A1 | * | 9/2008 | Wieser | B60N 2/68 267/136 |
| 2016/0069409 A1 | * | 3/2016 | McGranahan | F16F 9/34 188/380 |
| 2016/0298300 A1 | * | 10/2016 | Li | E01B 19/003 |

FOREIGN PATENT DOCUMENTS

| | | |
|---|---|---|
| JP | 01309886 A | 12/1989 |
| JP | H109337 A | 1/1998 |
| JP | 2007298067 A | 11/2007 |

\* cited by examiner

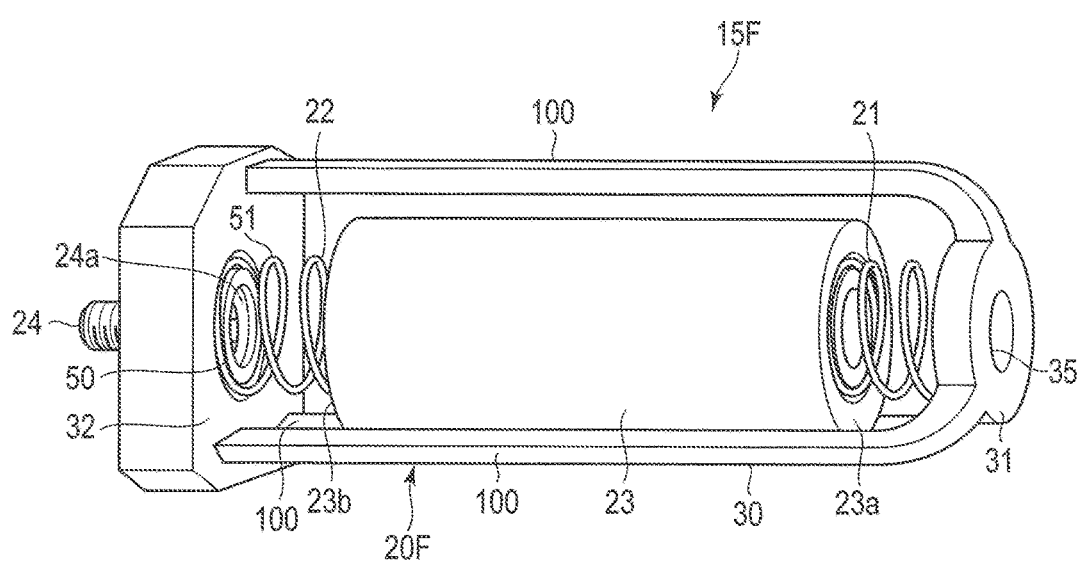
F I G. 16

DAMPING DEVICE

BACKGROUND OF THE INVENTION

1. Field of the Invention

The present invention relates to a damping device arranged in a vibration suppression target.

2. Description of the Related Art

In a vibration suppression target for which suppressing vibration is desired such as a member which constitutes a vehicle, a damping device may be arranged. A damping device described in, for example, U.S. Pat. No. 4,925,198B (Patent Literature 1) or JP1-309886A (Patent Literature 2) includes a base plate, a rod, a pair of coil springs, and an inertial mass. The inertial mass is disposed between the pair of coil springs, and moves only in a direction along an axis of the rod (i.e., axial direction). As another embodiment, Patent Literatures 1 and 2 describe a damping device comprising a housing, a pair of springs, and an inertial mass. The inertial mass is supported on an inner surface of the housing by bearings, and moves only in the axial direction of the housing.

When the inertial mass moves along the rod, friction is produced between the inertial mass and the rod. When the inertial mass moves along the housing, friction is produced between the inertial mass and the housing. Accordingly, in either case, in a low acceleration area, due to the friction, the inertial mass may not be operated. If a friction reduction member is used to minimize the friction, problems that the cost is increased, and the number of components is increased arise. Moreover, since the inertial mass moves in only one direction (axial direction), a damping effect can be exhibited only for the vibration vibration in multiple directions, multiple damping devices are required.

BRIEF SUMMARY OF THE INVENTION

An object of the present invention is to provide a damping device capable of operating also in a low acceleration area, and suppressing vibration in multiple directions.

The damping device of the present invention can be applied to various devices for which suppressing vibration is desired. While the damping device is suitable for suppressing vibration of a vehicle seat, for example, the purpose is not necessarily limited to this. The orientation of the damping device to be arranged is set in accordance with the specifications of the vibration suppression target, and is not limited to the embodiments described below.

An embodiment of the present invention relates to a damping device, which is arranged in a vibration suppression target, including a base member fixed to the vibration suppression target, a first coil spring formed of a first wire, a second coil spring formed of a second wire, and a weight member arranged between the first coil spring and the second coil spring.

The base member includes a main body portion including an axis, a first support portion provided on one end portion of the main body portion in an axial direction thereof, a second support portion provided on the other end portion in the axial direction of the main body portion. The first coil spring includes a first fixed-side end turn portion supported on the first support portion, a first effective portion extending in a direction toward the second support portion helically from the first fixed-side end turn portion, and a first movable-side end turn portion formed at a distal end of the first effective portion. The first coil spring is deflected in a longitudinal direction along the axis, and a transverse direction perpendicular to the axis.

The second coil spring includes a second fixed-side end turn portion supported on the second support portion, a second effective portion extending in a direction toward the first support portion helically from the second fixed-side end turn portion, and a second movable-side end turn portion formed at a distal end of the second effective portion. The second coil spring is also deflected in the longitudinal direction along the axis, and the transverse direction perpendicular to the axis.

The weight member is arranged in a state of compressing the first coil spring and the second coil spring. The weight member includes a first end portion supported on the first movable-side end turn portion, and a second end portion supported on the second movable-side end turn portion, and moves in the longitudinal direction and the transverse direction.

According to the damping device of the present embodiment, the weight member can be moved in the longitudinal direction along the axis and the transverse direction perpendicular to the axis, without being substantially affected by the friction, and can be operated even in a low acceleration area. The weight member can also be moved in at least a first transverse direction and a second transverse direction within a plane perpendicular to the axis. Accordingly, a vibration suppression function can be exhibited effectively also for vibration to be applied in multiple directions. Also, since members such as a rod and a housing for guiding the weight member are unnecessary, and a friction reduction member is also unnecessary, there is also an advantage that the number of components can be reduced.

In the damping device of the present embodiment, at least one of the effective portion of the first coil spring (first effective portion) and the effective portion of the second coil spring (second effective portion) may be controlled such that a spring constant derived when the spring is deflected in the second transverse direction is smaller than a spring constant derived when the spring is deflected in the first transverse direction.

Transverse stiffness of the coil spring (i.e., the spring constant in the transverse direction) depends on a coil diameter, a free length of the coil spring (the length when no load is applied), and a compression length (the length when the coil spring is compressed to a predetermined length). By optimizing these three elements according to the specifications required for the damping device, the spring constants in the first transverse direction and the second transverse direction can be adjusted. However, depending on the specifications of the coil spring, relying on only these three elements may be insufficient to adjust the spring constants in the first transverse direction and the second transverse direction. In such a case, the effective portion (first effective portion) of the first coil spring should preferably include one end-turn adjoining portion whose contact with the first fixed-side end turn portion is controlled, and the other end-turn adjoining portion whose contact with the first movable-side end turn portion is controlled, so that the number of turns when the first coil spring is deflected in the second transverse direction becomes greater than the number of turns when the first coil spring is deflected in the first transverse direction. The effective portion (second effective portion) of the second coil spring should preferably include one end-turn adjoining portion whose contact with the second fixed-side end turn portion is controlled, and the other end-turn adjoining portion whose contact with the second movable-side end turn portion is controlled, so that the number of turns when the second coil spring is deflected in the second transverse direction becomes greater than the number of turns when the second coil spring is deflected in the first transverse direction. An example of the first coil spring is slant shaped such that the first movable-side end turn portion becomes higher than the first fixed-side end turn portion in a free state of not supporting the weight member. The second coil spring is also slant shaped such that the second movable-side end turn portion becomes higher than the second fixed-side end turn portion in a state of not supporting the weight member. Further, in a state in which the weight of the weight member is applied to the first coil spring and the second coil spring, a central axis of the first coil spring and a central axis of the second coil spring may be made to be along the axis.

The first support portion may include a groove for inserting the first fixed-side end turn portion, and the second support portion may include a groove for inserting the second fixed-side end turn portion. Further, the first end portion of the weight member may include a groove for inserting the first movable-side end turn portion, and the second end portion of the weight member may include a groove for inserting the second movable-side end turn portion. Further, a rotation stopping portion for preventing the weight member from rotating about the axis may be provided.

A preferred embodiment may comprise a first through-hole which is formed in the first support portion, and penetrates in a direction along the axis, a second through-hole which is formed in the weight member, and extends in the direction along the axis, and a fixing bolt which is provided on the second support portion, and includes an operation portion arranged on the extension of the through-holes.

The damping device according to one embodiment is arranged in a vehicle seat comprising a seat cushion and a seat back. The base member of the damping device of this embodiment is arranged in a seat back such that the axis is parallel to a width direction of the seat back. The effective portion (first effective portion) of the first coil spring includes one end-turn adjoining portion whose contact with the first fixed-side end turn portion is controlled, and the other end-turn adjoining portion whose contact with the first movable-side end turn portion is controlled, so that the number of turns when the first coil spring is deflected in a front-to-back direction of the seat back becomes greater than the number of turns when the first coil spring is deflected in a vertical direction of the seat back. Further, the effective portion (second effective portion) of the second coil spring includes one end-turn adjoining portion whose contact with the second fixed-side end turn portion is controlled, and the other end-turn adjoining portion whose contact with the second movable-side end turn portion is controlled, so that the number of turns when the second coil spring is deflected in the front-to-back direction becomes greater than the number of turns when the second coil spring is deflected in the vertical direction of the seat back. The weight member moves at least in the width direction, the front-to-back direction, and the vertical direction of the seat back. The spring constants of the first coil spring and the second coil spring when the weight member moves in the front-to-back direction are smaller than those when the weight member moves in the width direction and the vertical direction of the seat back. In this embodiment, a dimension of the weight member in the front-to-back direction may be smaller than a dimension of the same in the vertical direction. Further, a rotation stopping portion for preventing the weight member from rotating about the axis may be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF DRAWING

The accompanying drawings, which are incorporated in and constitute a part of the specification, illustrate embodiments of the invention, and together with the general description given above and the detailed description of the embodiments given below, serve to explain the principles of the invention.

FIG. 16 is a perspective view of a damping device according to a seventh embodiment.

DETAILED DESCRIPTION OF THE INVENTION

A damping device according to a first embodiment will be described with reference to FIGS. 1 to 9.

Figure 1:
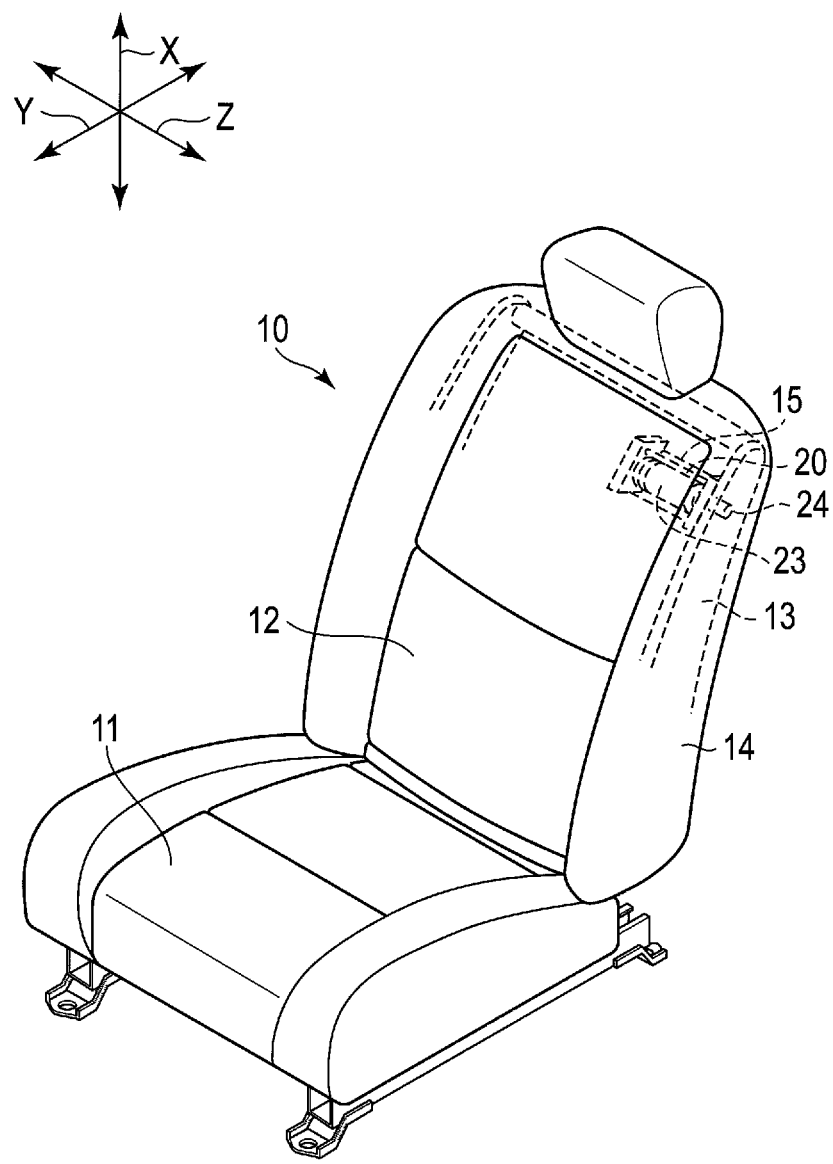
FIG. 1 is a perspective view of a vehicle seat comprising a damping device according to a first embodiment.

FIG. 1 shows a vehicle seat 10. The seat 10 comprises a seat cushion 11 and a seat back 12. The seat back 12, which is an example of a vibration suppression target, includes a frame 13, and a pad member 14 covering the frame 13. A damping device 15 is arranged in the seat back 12. Arrow X in FIG. 1 represents a vertical direction of the seat back 12, and arrow Y represents a front-to-back direction of the same. Arrow Z indicates a width direction of the seat back 12.

Figure 2:
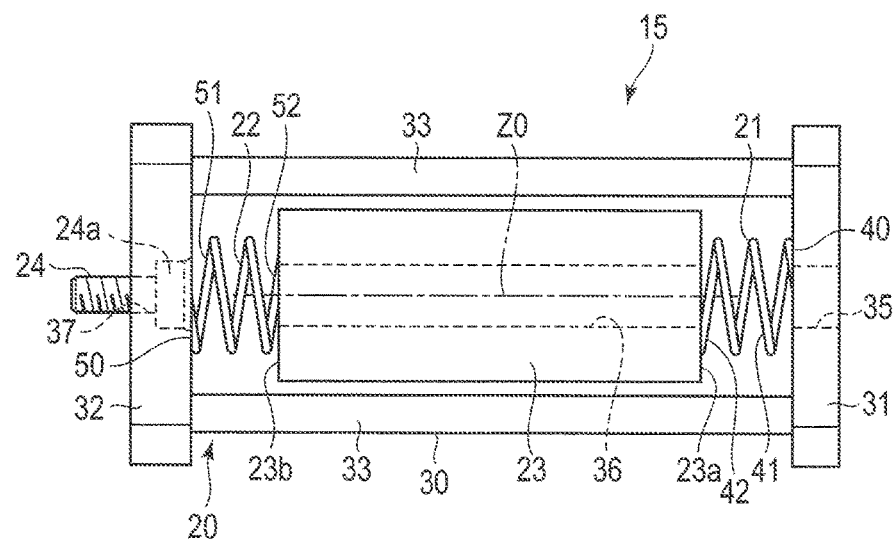
FIG. 2 is a front view of the damping device shown in FIG. 1.
Figure 3:
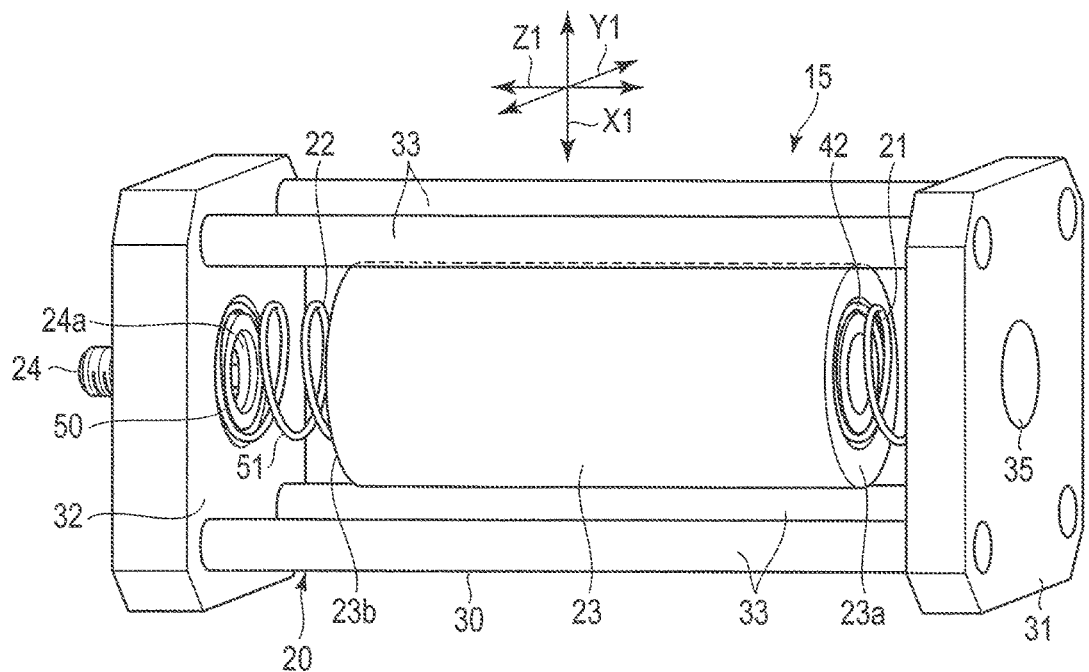
FIG. 3 is a perspective view of the damping device.

FIG. 2 is a front view of the damping device 15, and FIG. 3 is a perspective view of the damping device 15. The damping device 15 includes a base member 20, a first coil spring 21, a second coil spring 22, a weight member 23, and a fixing bolt 24. Although the base member 20 is made of metal in one example, the base member 20 may be made of resin if the strength is sufficient. The base member 20 includes a main body portion 30 including an axis Z0, a first support portion 31, and a second support portion 32. The main body portion 30 is constituted of a plurality of rods 33. In this specification, a direction along the axis Z0 is referred to as an axial direction Z1.

The first support portion 31 of the base member 20 is provided on one end portion of the main body portion 30 in the axial direction thereof. The second support portion 32 is provided on the other end portion of the main body portion 30 in the axial direction thereof. The base member 20 is fixed to the frame 13 of the seat back 12 (FIG. 1) by the bolt 24 such that the axis Z0 is parallel to the width direction of the seat back 12.

Figure 4:
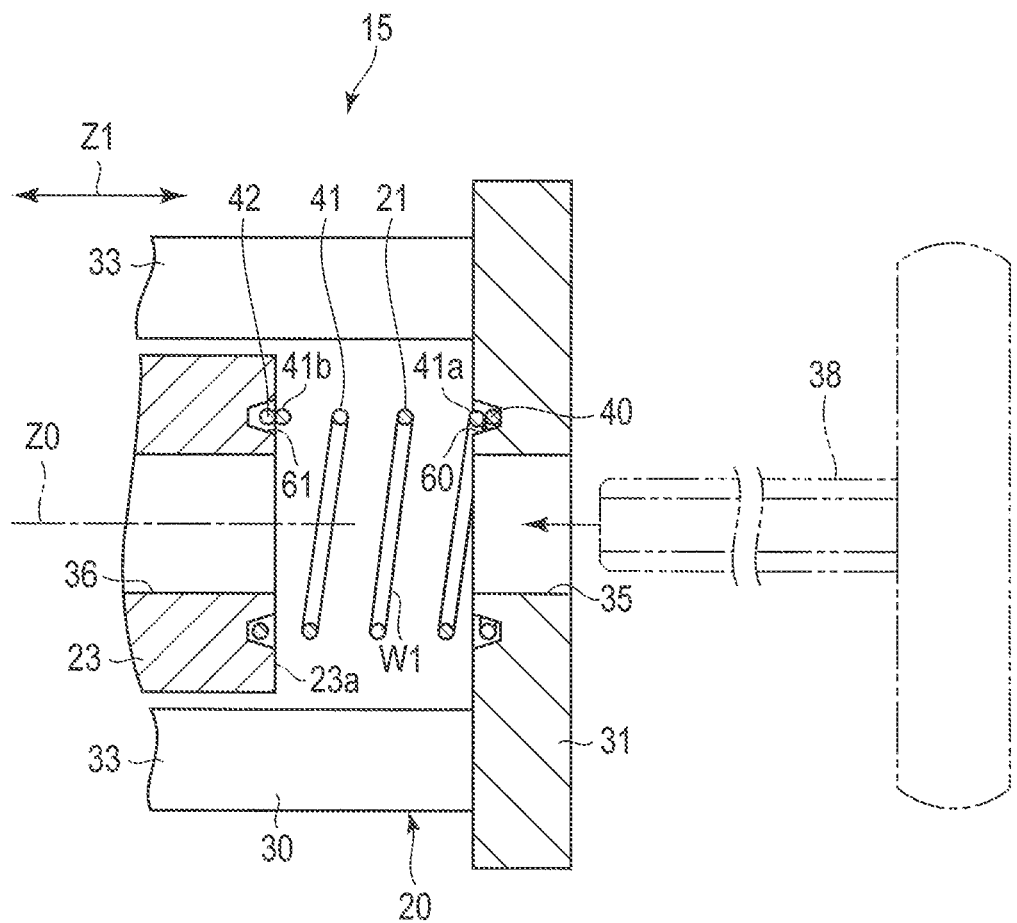
FIG. 4 is a cross-sectional view of one end portion of the damping device.

FIG. 4 is a cross-sectional view of one end portion of the damping device 15. A first through-hole 35 is formed in the first support portion 31 of the base member 20. The first through-hole 35 extends in the axial direction Z1. In the weight member 23, a second through-hole 36 extending in the axial direction Z1 is formed.

Figure 5:
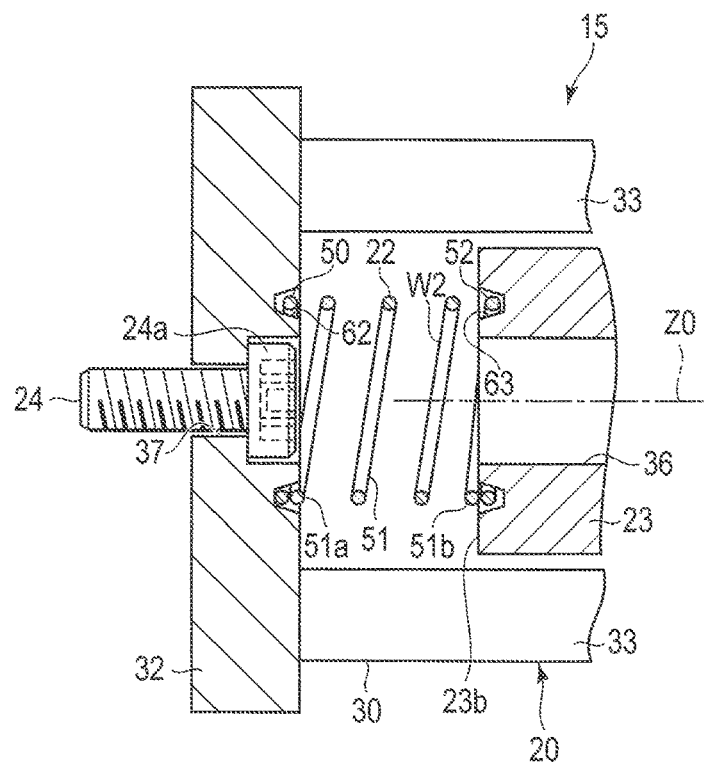
FIG. 5 is a cross-sectional view of the other end portion of the damping device.

FIG. 5 is a cross-sectional view of the other end portion of the damping device 15. In the second support portion 32, a hole 37 into which the fixing bolt 24 is inserted is formed. An operation portion 24a provided at a head portion of the bolt 24 is arranged on the extension of the through-holes 35 and 36. An example of a tool 38 (FIG. 4) for rotating the bolt 24 is a rod-shaped wrench. By inserting this tool 38 into the first through-hole 35 and the second through-hole 36, a distal end of the tool 38 is fitted into the operation portion 24a of the bolt 24. In this way, the bolt 24 is rotated.

Figure 6:
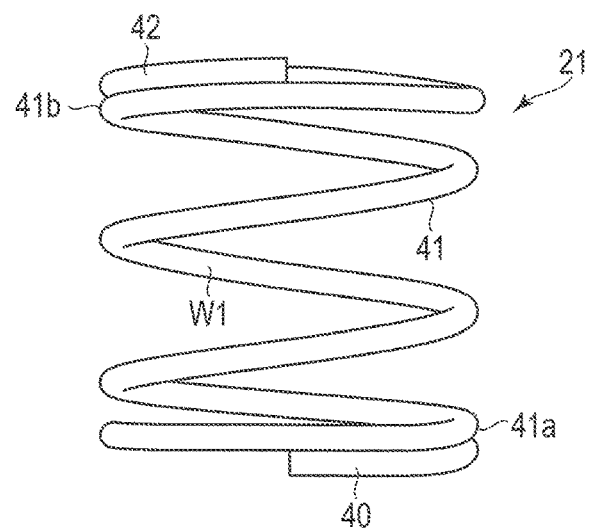
FIG. 6 is a side view of a first coil spring of the damping device.

FIG. 6 is a side view of the first coil spring 21. The first coil spring 21 is formed by shaping a first wire W1 made of spring steel helically. The coil spring 21 includes a first fixed-side end turn portion 40, a first effective portion 41, and a first movable-side end turn portion 42. In a state in which the first fixed-side end turn portion 40 is supported on the first support portion 31, the first effective portion 41 extends in a direction toward the second support portion 32 helically from the first fixed-side end turn portion 40. The first movable-side end turn portion 42 is formed at a distal end of the first effective portion 41.

The first effective portion 41 is a portion where adjacent winding portions of the wire W1 do not contact each other, and which functions effectively as a spring, in a state in which the first coil spring 21 is compressed to the maximum. The first effective portion 41 includes an end-turn adjoining portion 41a, on one side, whose position of contact with the first fixed-side end turn portion 40 is varied, and an end-turn adjoining portion 41b, on the other side, whose position of contact with the first movable-side end turn portion 42 is varied. The operation of these end-turn adjoining portions 41a and 41b will be described in detail later.

The second coil spring 22 is formed by shaping a second wire W2 made of spring steel helically. The coil spring 22 includes a second fixed-side end turn portion 50, a second effective portion 51, and a second movable-side end turn portion 52. In a state in which the second fixed-side end turn portion 50 is supported on the second support portion 32, the second effective portion 51 extends in a direction toward the first support portion 31 helically from the second fixed-side end turn portion 50. The second movable-side end turn portion 52 is formed at a distal end of the second effective portion 51.

The second effective portion 51 is a portion where adjacent winding portions of the wire W2 do not contact each other, and which functions effectively as a spring, in a state in which the second coil spring 22 is compressed to the maximum. As shown in FIG. 5, the second effective portion 51 also includes an end-turn adjoining portion 51a, on one side, whose position of contact with the second fixed-side end turn portion 50 is varied, and an end-turn adjoining portion 51b, on the other side, whose position of contact with the second movable-side end turn portion 52 is varied.

In this specification, the direction along the axis Z0 (i.e., axial direction Z1) is referred to as a longitudinal direction. The axial direction Z1 is also a width direction of the seat back 12. Further, a direction along a plane perpendicular to the axial direction Z1 is referred to as a transverse direction. In other words, the transverse direction is a radial direction of the coil springs 21 and 22. Each of the first coil spring 21 and the second coil spring 22 can be deflected in the longitudinal direction and the transverse direction. The transverse direction includes a first transverse direction X1 (FIG. 3) extending in the vertical direction of the seat back 12, and a second transverse direction Y1 along the front-to-back direction of the seat back 12.

In the damping device 15 of the present embodiment, at least one of the first effective portion 41 and the second effective portion 51 may be controlled such that a spring constant derived when the spring is deflected in the second transverse direction Y1 is smaller than a spring constant derived when the spring is deflected in the first transverse direction X1. Since the shapes and functions of the first coil spring 21 and the second coil spring 22 are common to each other, the first coil spring 21 will be described as a typical example of the coil springs.

Figure 7A:
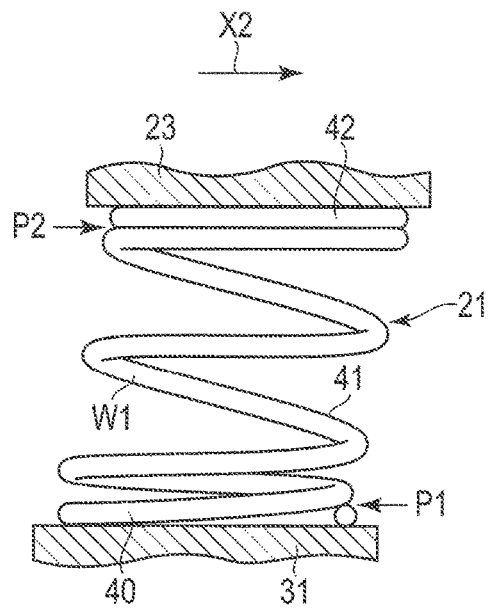
FIG. 7A is a front view of a state in which the coil spring is deflected to one side in a first transverse direction.

FIG. 7A shows the state in which the movable-side end turn portion 42 moves relatively to one side in the first transverse direction (i.e., a direction indicated by arrow X2). More specifically, the figure shows the state in which the coil spring 21 is deflected to one side in the first transverse direction. At this time, the number of turns from point P1 where the fixed-side end turn portion 40 is in contact with the effective portion 41 to point P2 where the movable-side end turn portion 42 is in contact with the effective portion 41, in other words, the number of effective turns, is approximately 2.5 turns.

Figure 7B:
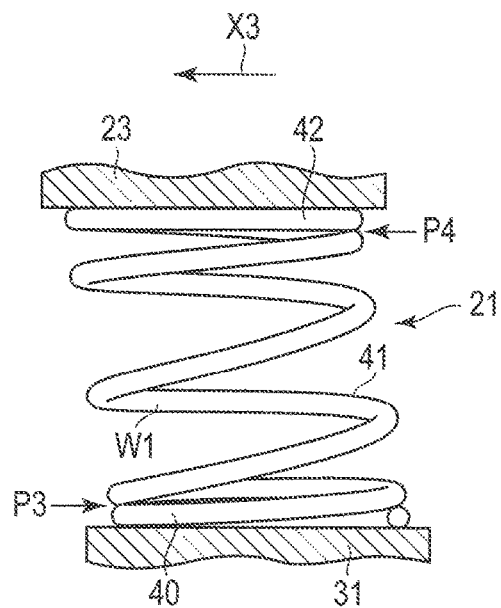
FIG. 7B is a front view of a state in which the coil spring is deflected to the other side in the first transverse direction.

FIG. 7B shows the state in which the movable-side end turn portion 42 moves relatively to the other side in the first transverse direction (i.e., a direction indicated by arrow X3). More specifically, the figure shows the state in which the coil spring 21 is deflected to the other side in the first transverse direction. At this time, the number of turns from point P3 where the fixed-side end turn portion 40 is in contact with the effective portion 41 to point P4 where the movable-side end turn portion 42 is in contact with the effective portion 41, in other words, the number of effective turns, is approximately 2.5 turns.

Figure 8A:
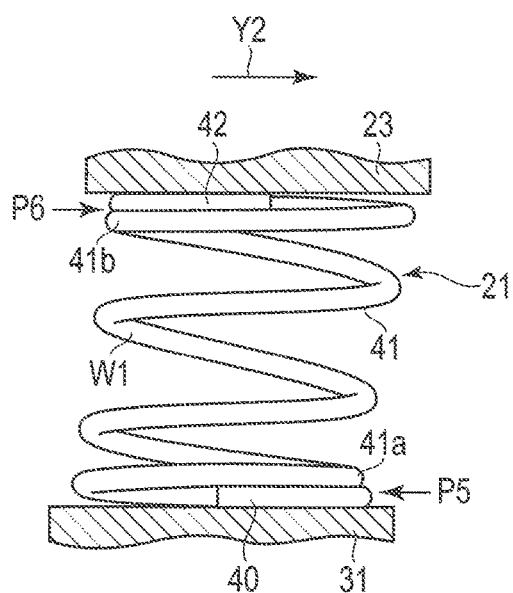
FIG. 8A is a side view of a state in which the coil spring is deflected to one side in a second transverse direction.

FIG. 8A shows the state in which the movable-side end turn portion 42 moves relatively to one side in the second transverse direction (i.e., a direction indicated by arrow Y2). More specifically, the figure shows the state in which the coil spring 21 is deflected to one side in the second transverse direction. At this time, the number of turns from point P5 where the fixed-side end turn portion 40 is in contact with the end-turn adjoining portions 41a, on one side, to point P6 where the movable-side end turn portion 42 is in contact with the other end-turn adjoining portion 41b, in other words, the number of effective turns, is approximately 2.5 turns.

Figure 8B:
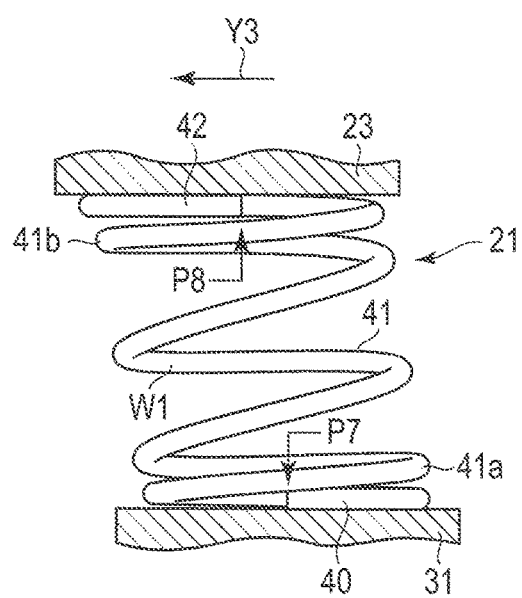
FIG. 8B is a side view of a state in which the coil spring is deflected to the other side in the second transverse direction.

FIG. 8B shows the state in which the movable-side end turn portion 42 moves relatively to the other side in the second transverse direction (i.e., a direction indicated by arrow Y3). More specifically, the figure shows the state in which the coil spring 21 is deflected to the other side in the second transverse direction. At this time, as the end-turn adjoining portions 41a, on one side, is separated from the fixed-side end turn portion 40, the other end-turn adjoining portion 41b is separated from the movable-side end turn portion 42. Accordingly, the number of turns from point P7 where the fixed-side end turn portion 40 is in contact with the effective portion 41 to point P8 where the movable-side end turn portion 42 is in contact with the effective portion 41, in other words, the number effective turns, is approximately 3.0 turns. Here, since the number of effective turns takes on different values depending on the conditions such as the shapes of the end turn portions 40 and 42 and the end-turn adjoining portions 41a and 41b and the pitch angle, the numerical values are not limited to those described above.

Because contact between the end-turn adjoining portions 41a and 41b and the end turn portions 40 and 42 is controlled as described above, the number of turns of the effective portion 41 when the coil spring 21 is deflected in the second transverse direction (front-to-back direction of the seat back 12) becomes greater than the number of turns when the coil spring 21 is deflected in the first transverse direction (vertical direction). Accordingly, the spring constant derived when the coil spring 21 is deflected in the second transverse direction becomes smaller than the spring constant derived when the coil spring 21 is deflected in the first transverse direction.

As shown in FIG. 5, the effective portion 51 of the second coil spring 22 also includes the end-turn adjoining portion 51a, on one side, and the end-turn adjoining portion 51b, on the other side, likewise the first coil spring 21. The operation of these end-turn adjoining portions 51a and 51b is similar to the operation of the end-turn adjoining portions 41a and 41b of the first coil spring 21. In other words, the second coil spring 22 includes the end-turn adjoining portions 51a and 51b structured such that the number of turns of the effective portion 51 when the second coil spring 22 is deflected in the second transverse direction (front-to-back direction of the seat back 12) is increased as compared to the number of turns when the second coil spring 22 is deflected in the first transverse direction (vertical direction).

A spring constant in the longitudinal direction (axial direction Z1) of the coil springs 21 and 22 is set such that a characteristic frequency in a longitudinal direction of the weight member 23 corresponds to a resonance frequency in the width direction of the seat back 12. A spring constant in the first transverse direction of the coil springs 21 and 22 is set such that a characteristic frequency in a vertical direction of the weight member 23 corresponds to a resonance frequency in the vertical direction of the seat back 12. A spring constant in the second transverse direction of the coil springs 21 and 22 is set such that a characteristic frequency in a front-to-back direction of the weight member 23 corresponds to a resonance frequency in the front-to-back direction of the seat back 12.

The weight member 23 is arranged between the first coil spring 21 and the second coil spring 22 in such a state that it compresses these coil springs 21 and 22. One example of the weight member 23 is made of metal, and has a cylindrical shape. A first end portion 23a of the weight member 23 is supported by the movable-side end turn portion 42 of the first coil spring 21. A second end portion 23b of the weight member 23 is supported by the movable-side end turn portion 52 of the second coil spring 22. Accordingly, the weight member 23 can be moved in at least the width direction, the front-to-back direction, and the vertical direction of the seat back 12.

As shown in FIG. 4, on the first support portion 31 of the damping device 15 of the present embodiment, a groove 60 for inserting the first fixed-side end turn portion 40 is formed. On the first end portion 23a of the weight member 23, a groove 61 for inserting the first movable-side end turn portion 42 is formed. As shown in FIG. 5, on the second support portion 32, a groove 62 for inserting the second fixed-side end turn portion 50 is formed. On the second end portion 23b of the weight member 23, a groove 63 for inserting the second movable-side end turn portion 52 is formed.

As described above, the number of turns of the effective portions 41 and 51 when the coil springs 21 and 22 are deflected in the second transverse direction (front-to-back direction of the seat back 12) is increased as compared to the number of turns when the coil springs 21 and 22 are deflected in the first transverse direction (vertical direction).

Accordingly, the spring constant of the coil springs 21 and 22 when the weight member 23 moves in the front-to-back direction is smaller than the spring constant of the same when the weight member 23 moves in the vertical direction.

Figure 9:
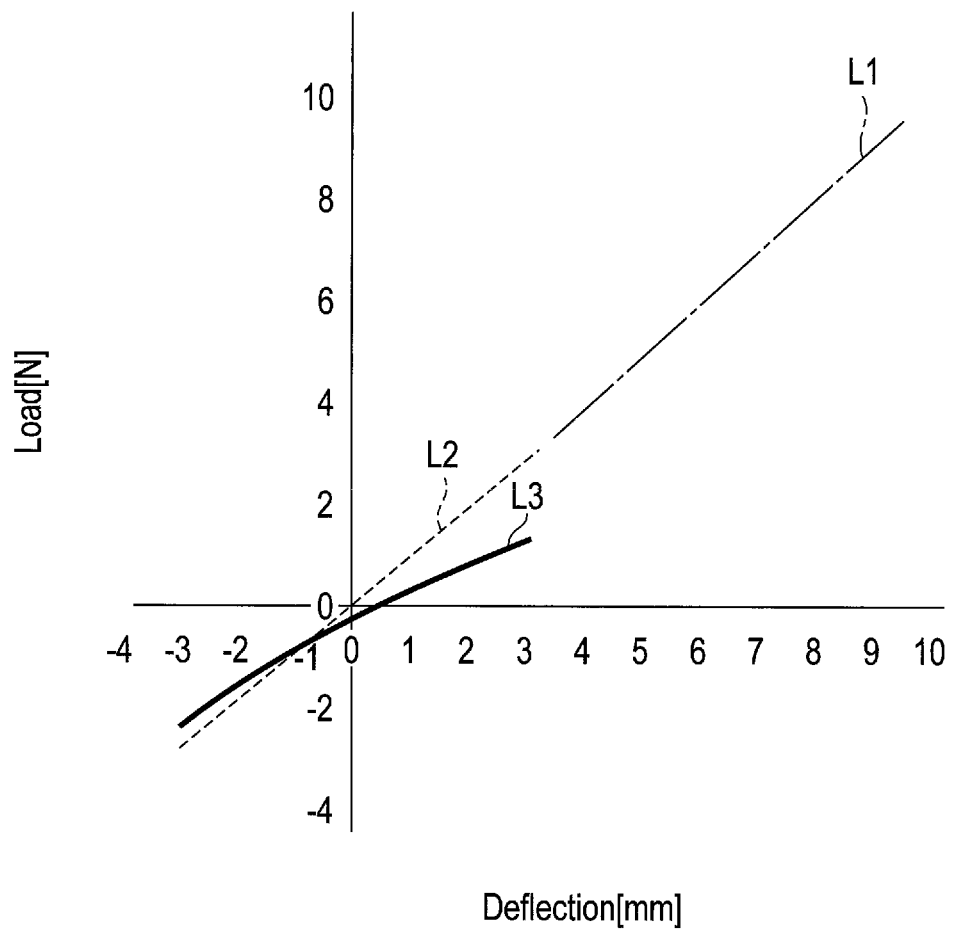
FIG. 9 is a graph showing the relationship between deflection and a load of the coil spring.

FIG. 9 is a graph showing the relationship between deflection and a load of the first coil spring 21. The second coil spring 22 also has the relationship between deflection and a load similar to that of the first coil spring 21. A one-dot chain line L1 in FIG. 9 represents the relationship between the deflection and the load of the coil spring 21 when the weight member 23 moves in the axial direction Z1 thereof (i.e., in the width direction of the seat back 12). A broken line L2 represents the relationship between the deflection and the load of the coil spring 21 when the weight member 23 moves in the first transverse direction (vertical direction). A solid line L3 represents the relationship between the deflection and the load of the coil spring 21 when the weight member 23 moves in the second transverse direction (front-to-back direction).

As described above, the number of turns of the effective portion 41 when the coil spring 21 moves in the front-to-back direction of the seat back 12 is greater than the number of turns of the effective portion 41 when the coil spring 21 moves in the vertical direction of the seat back 12. Accordingly, as shown in FIG. 9, the spring constant of the coil springs 21 and 22 when the weight member 23 moves in the second transverse direction (front-to-back direction of the seat back 12) is smaller than the spring constant of the same when the weight member 23 moves in the first transverse direction (vertical direction of the seat back 12).

In terms of the structure of the seat 10, the resonance frequency in the front-to-back direction of the seat back 12 is lower than each of the resonance frequencies in the width direction and the vertical direction. Accordingly, the damping device 15 of the present embodiment is arranged such that the axis Z0 is parallel to the width direction of the seat back 12, and the first transverse direction corresponds to the vertical direction of the seat back 12. The second transverse direction corresponds to the front-to-back direction of the seat back 12. Consequently, by a single damping device 15, vibrations in multiple directions which occur in the seat back 12 can be effectively suppressed, and in particular, the vibration in the front-to-back direction of the seat back 12 can be suppressed.

Figure 10:
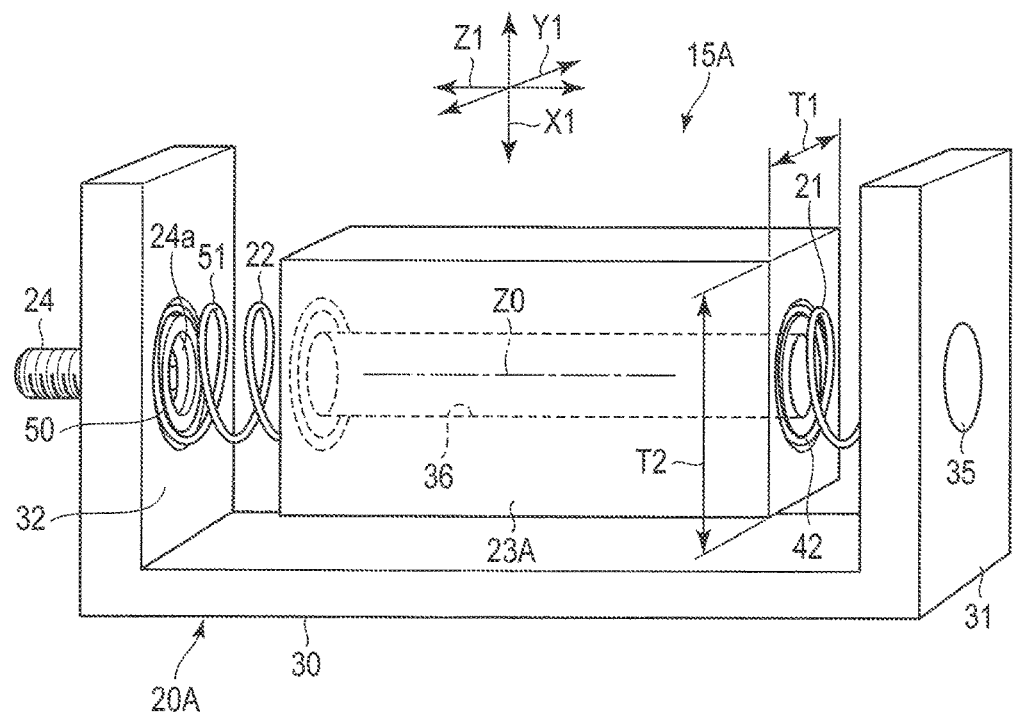
FIG. 10 is a perspective view of a damping device according to a second embodiment.
Figure 11:
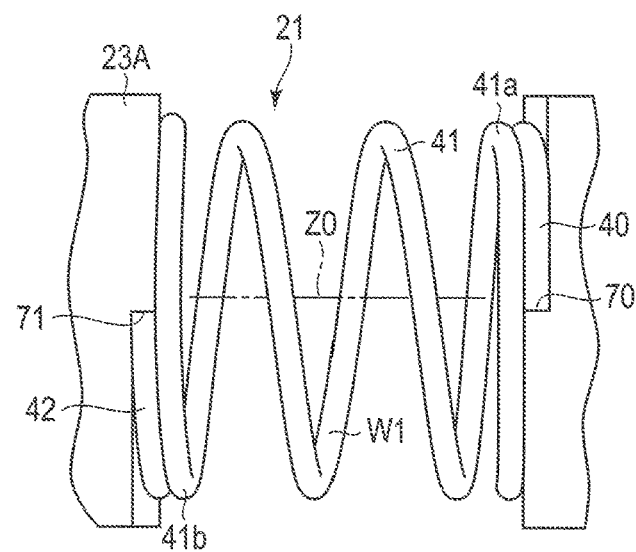
FIG. 11 is a front view of a part of the damping device shown in FIG. 10.

FIG. 10 shows a damping device 15A according to a second embodiment. FIG. 11 is a front view of a part of the damping device 15A shown in FIG. 10. A weight member 23A of this embodiment has a flat rectangular shape, and a dimension T1 in the front-to-back direction is smaller than a dimension T2 in the vertical direction. Accordingly, this embodiment is advantageous in securing a space for accommodating the damping device 15A in the case of a seat back having a restriction on the thickness in the front-to-back direction. Also, the damping device 15A includes rotation stopping portions 70 and 71 for preventing the weight member 23A from rotating about an axis Z0, as shown in FIG. 11.

As shown in FIG. 10, a main body portion 30 of a base member 20A of the damping device 15A is provided on only one side of the base member 20A. By this feature, not only is the structure of the base member 20A simplified, but assembly of the damping device 15A is also facilitated. In the damping device 15A of the present embodiment, since the other structures and functions have commonalities with those of the damping device 15 of the first embodiment, common reference numbers are assigned to common parts in the two, and explanation of such parts is omitted.

Figure 12:
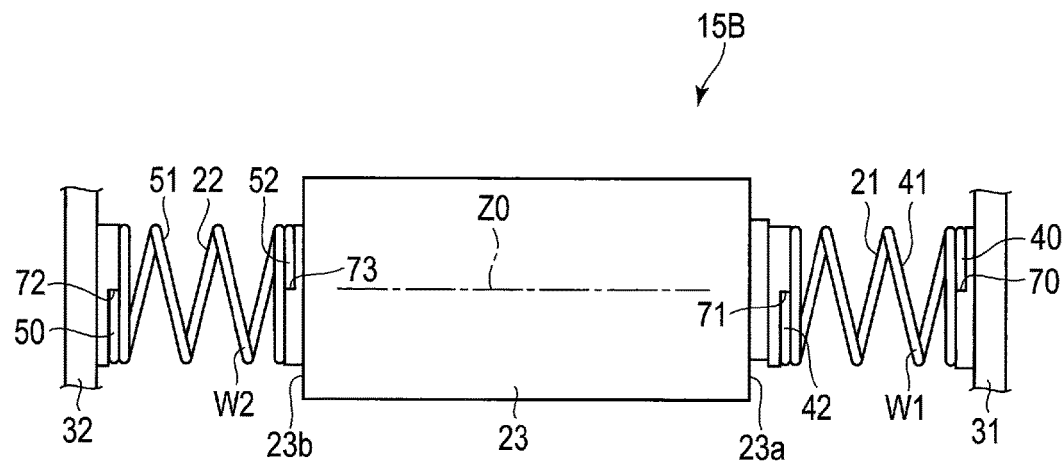
FIG. 12 is a front view of a damping device according to a third embodiment.

FIG. 12 shows a damping device 15B according to a third embodiment. On a first support portion 31 and a first end portion 23a of a weight member 23, rotation stopping portions 70 and 71 for preventing the weight member 23 from rotating about an axis Z0 are provided, respectively. Also on a second support portion 32 and a second end portion 23b of the weight member 23, rotation stopping portions 72 and 73 for preventing the weight member 23 from rotating about the axis Z0 are provided, respectively. In the damping device 15B of the present embodiment, since the other structures and functions have commonalities with those of the damping device 15 of the first embodiment, common reference numbers are assigned to common parts in the two, and explanation of such parts is omitted.

Figure 13:
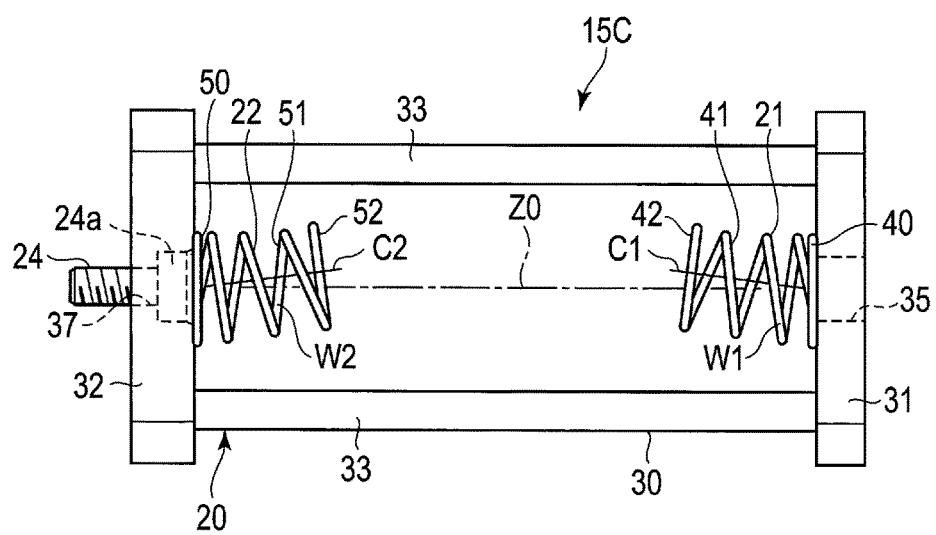
FIG. 13 is a front view of a state before a weight member is mounted in a damping device according to a fourth embodiment.

FIG. 13 shows the state before a weight member is mounted in a damping device 15C according to a fourth embodiment. A first coil spring 21 of this embodiment is shaped to have a coil central axis C1 inclined in such a way that a first movable-side end turn portion 42 becomes higher than a first fixed-side end turn portion 40 in a free state of not supporting the weight member. A second coil spring 22 is also shaped to have a coil central axis C2 inclined in such a way that a second movable-side end turn portion 52 becomes higher than a second fixed-side end turn portion 50 in a free state of not supporting the weight member.

In a state in which the weight of the weight member 23 is applied to the first coil spring 21 and the second coil spring 22, the central axis C1 of the first coil spring 21 and the central axis C2 of the second coil spring 22 are along an axis Z0. In the damping device 15C of the present embodiment, since the other structures and functions have commonalities with those of the damping device 15 of the first embodiment, common reference numbers are assigned to common parts in the two, and explanation of such parts is omitted.

Figure 14:
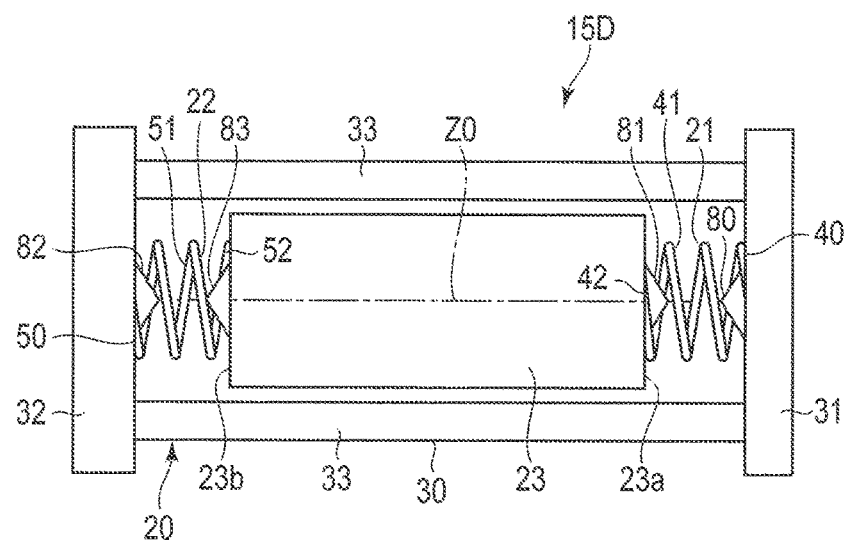
FIG. 14 is a front view of a damping device according to a fifth embodiment.

FIG. 14 shows a damping device 15D according to a fifth embodiment. On a first support portion 31, a conical convex portion 80 which supports a first fixed-side end turn portion 40 is provided. On a first end portion 23a of a weight member 23, a conical convex portion 81 which supports a first movable-side end turn portion 42 is provided. On a second support portion 32, a conical convex portion 82 which supports a second fixed-side end turn portion 50 is provided. On a second end portion 23b of the weight member 23, a conical convex portion 83 which supports a second movable-side end turn portion 52 is provided. The weight member 23 is formed of solid metal. In the damping device 15D of the present embodiment, since the other structures and functions have commonalities with those of the damping device 15 of the first embodiment, common reference numbers are assigned to common parts in the two, and explanation of such parts is omitted.

Figure 15:
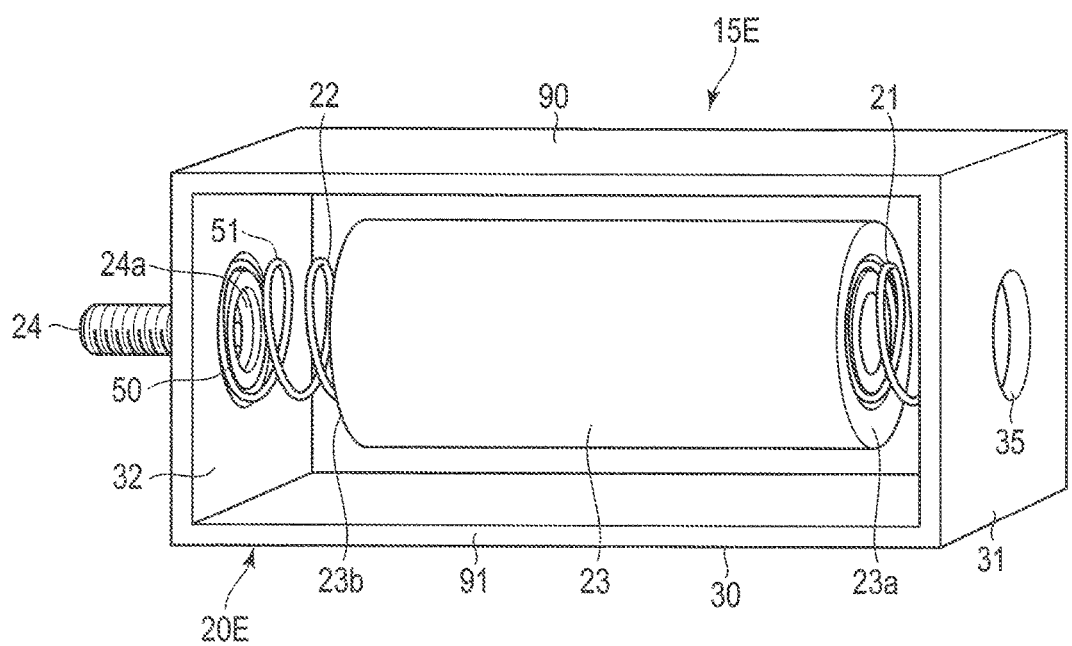
FIG. 15 is a perspective view of a damping device according to a sixth embodiment.

FIG. 15 shows a damping device 15E according to a sixth embodiment. A main body portion 30 of a base member 20E of this embodiment is constituted of a pair of lateral plates 90 and 91. The base member 20E and the support portions 31 and 32 can be manufactured by a metal member such as a metal plate. In the damping device 15E of the present embodiment, since the other structures and functions have commonalities with those of the damping device 15 of the first embodiment, common reference numbers are assigned to common parts in the two, and explanation of such parts is omitted.

FIG. 16 shows a damping device 15F according to a seventh embodiment. A main body portion 30 of a base member 20F of this embodiment is constituted of a plurality of (for example, three) rod portions 100. These rod portions 100 are arranged at predetermined intervals (regular intervals, for example) in a circumferential direction of a weight member 23. Consequently, the outer shape of the base member 20F can be formed relatively small. In the damping device 15F of the present embodiment, since the other structures and functions have commonalities with those of the damping device 15 of the first embodiment, common reference numbers are assigned to common parts in the two, and explanation of such parts is omitted.

A damping device according to the present invention is not limited to those of the above embodiments. The damping device in its broader aspect can be arranged in a vibration suppression target other than a vehicle seat. The orientation of the damping device to be arranged is determined in accordance with a direction in which vibration which should be suppressed is input. The first coil spring 21 of the damping device is deflected in the longitudinal direction along the axis of the base member 20, and the transverse direction along a plane perpendicular to the axis. The second coil spring 22 is also deflected in the longitudinal direction along the axis of the base member 20, and the transverse direction along a plane perpendicular to the axis. The weight member 23 moves in the longitudinal direction and the transverse direction.

A spring constant in the longitudinal direction (direction along the axis) of the coil springs 21 and 22 is set such that a characteristic frequency in the longitudinal direction of the weight member 23 corresponds to a resonance frequency in the longitudinal direction of the vibration suppression target. A spring constant in the transverse direction (direction perpendicular to the axis) of the coil springs 21 and 22 is set such that a characteristic frequency in the transverse direction of the weight member 23 corresponds to a resonance frequency in the transverse direction of the vibration suppression target.

The effective portion 41 of the first coil spring 21 should preferably include the end-turn adjoining portion 41a, on one side, whose contact with the first fixed-side end turn portion 40 is controlled, and the end-turn adjoining portion 41b, on the other side, whose contact with the first movable-side end turn portion 42 is controlled, so that the number of turns when the first coil spring 21 is deflected in the second transverse direction becomes greater than the number of turns when the first coil spring 21 is deflected in the first transverse direction. Preferably, the effective portion 51 of the second coil spring 22 should also include the end-turn adjoining portion 51a, on one side, whose contact with the second fixed-side end turn portion 50 is controlled, and the end-turn adjoining portion 51b, on the other side, whose contact with the second movable-side end turn portion 52 is controlled, so that the number of turns when the second coil spring 22 is deflected in the second transverse direction becomes greater than the number of turns when the second coil spring 22 is deflected in the first transverse direction.

Needless to say, the quality of the material, shape, and arrangement of each member which constitutes the damping device, such as the base member, the first coil spring, the second coil spring, and the weight member of the damping device, can be modified as needed in implementing the invention. Also, the damping device may be arranged in a vibration suppression target other than the vehicle seat.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A damping device arranged in a vibration suppression target, a first resonance frequency in a first lateral direction of the vibration suppression target being greater than a second resonance frequency in a second lateral direction of the vibration suppression target, and the damping device comprising:
    a base member including a main body portion including an axis, a first support portion provided on one side of the main body portion in an axial direction thereof, and a second support portion provided on the other side of the main body portion in the axial direction, the base member being fixed to the vibration suppression target;
    a first coil spring formed of a first wire, the first coil spring including a first fixed-side end turn portion supported on the first support portion, a first effective portion extending in a direction toward the second support portion helically from the first fixed-side end turn portion, and a first movable-side end turn portion formed at a distal end of the first effective portion, the first coil spring being deflected in a longitudinal direction along the axis, a first transverse direction corresponding to the first lateral direction perpendicular to the axis, and a second transverse direction corresponding to the second lateral direction perpendicular to the axis, and the first effective portion being controlled such that a spring constant derived when deflection occurs in the second transverse direction is smaller than a spring constant derived when deflection occurs in the first transverse direction;
    a second coil spring formed of a second wire, the second coil spring including a second fixed-side end turn portion supported on the second support portion, a second effective portion extending in a direction toward the first support portion helically from the second fixed-side end turn portion, and a second movable-side end turn portion formed at a distal end of the second effective portion, the second coil spring being deflected in the longitudinal direction along the axis and the first and second transverse directions perpendicular to the axis, and the second effective portion being controlled such that a spring constant derived when deflection occurs in the second transverse direction is smaller than a spring constant derived when deflection occurs in the first transverse direction; and
    a weight member arranged between the first coil spring and the second coil spring in a state of compressing the first coil spring and the second coil spring, the weight member including a first end portion supported on the first movable-side end turn portion, and a second end portion supported on the second movable-side end turn portion, and being moved in the longitudinal direction and the first and second transverse directions.

2. The damping device of claim 1, wherein the first effective portion includes a first end-turn adjoining portion whose contact with the first fixed-side end turn portion is controlled, and a second end-turn adjoining portion whose contact with the first movable-side end turn portion is controlled, such that a number of active turns of the first wire of the first effective portion when deflection occurs in the second transverse direction becomes greater than a number of active turns of the first wire of the first effective portion when deflection occurs in the first transverse direction.

3. The damping device of claim 1, wherein the second effective portion includes a first end-turn adjoining portion whose contact with the second fixed-side end turn portion is controlled, and a second end-turn adjoining portion whose contact with the second movable-side end turn portion is controlled, such that a number of active turns of the second wire of the second effective portion when deflection occurs in the second transverse direction becomes greater than a number of active turns of the second wire of the second effective portion when deflection occurs in the first transverse direction.

4. The damping device of claim 2, wherein the second effective portion includes a third end-turn adjoining portion whose contact with the second fixed-side end turn portion is controlled, and a fourth end-turn adjoining portion whose contact with the second movable-side end turn portion is controlled, such that a number of active turns of the second wire of the second effective portion when deflection occurs in the second transverse direction becomes greater than a number of active turns of the second wire of the second effective portion when deflection occurs in the first transverse direction.

5. The damping device of claim 1, wherein:
    the first coil spring is slant shaped such that the first movable-side end turn portion becomes higher than the first fixed-side end turn portion in a free state of not supporting the weight member;
    the second coil spring is slant shaped such that the second movable-side end turn portion becomes higher than the second fixed-side end turn portion in the free state of not supporting the weight member; and
    a central axis of the first coil spring and a central axis of the second coil spring are along the axis in a state in which a weight of the weight member is applied to the first coil spring and the second coil spring.

6. The damping device of claim 1, wherein:
    the first support portion includes a groove for inserting the first fixed-side end turn portion;
    the second support portion includes a groove for inserting the second fixed-side end turn portion;

the first end portion of the weight member includes a groove for inserting the first movable-side end turn portion; and the second end portion of the weight member includes a groove for inserting the second movable-side end turn portion.

7. The damping device of claim 1, further comprising a rotation stopping portion for preventing the weight member from rotating about the axis.

8. The damping device of claim 1, further comprising:
a first through-hole which is formed in the first support portion, and penetrates in a direction along the axis;
a second through-hole which is formed in the weight member, and penetrates in the direction along the axis; and
a fixing bolt which is provided on the second support portion, and includes an operation portion arranged on an extension of the second through-hole.

9. A damping device arranged in a vehicle seat comprising a seat cushion and a seat back, a first resonance frequency in a vertical direction of the seat back being greater than a second resonance frequency in a front-to-back direction of the seat back, and the damping device comprising:
a base member including a main body portion including an axis, a first support portion provided on one side of the main body portion in an axial direction thereof, and a second support portion provided on the other side of the main body portion in the axial direction, the base member being fixed to the seat back such that the axis is parallel to a width direction of the seat back;
a first coil spring formed of a first wire, the first coil spring including a first fixed-side end turn portion supported on the first support portion, a first effective portion extending in a direction toward the second support portion helically from the first fixed-side end turn portion, and a first movable-side end turn portion formed at a distal end of the first effective portion, the first effective portion including a first end-turn adjoining portion whose contact with the first fixed-side end turn portion is controlled, and a second end-turn adjoining portion whose contact with the first movable-side end turn portion is controlled, such that a number of active turns of the first wire of the first effective portion when deflection occurs in the front-to-back direction of the seat back becomes greater than a number of active turns of the first wire of the first effective portion when deflection occurs in the vertical direction of the seat back;
a second coil spring formed of a second wire, the second coil spring including a second fixed-side end turn portion supported on the second support portion, a second effective portion extending in a direction toward the first support portion helically from the second fixed-side end turn portion, and a second movable-side end turn portion formed at a distal end of the second effective portion, the second effective portion including a third end-turn adjoining portion whose contact with the second fixed-side end turn portion is controlled, and a fourth end-turn adjoining portion whose contact with the second movable-side end turn portion is controlled, such that a number of active turns of the second wire of the second effective portion when deflection occurs in the front-to-back direction becomes greater than a number of active turns of the second wire of the second effective portion when deflection occurs in the vertical direction of the seat back; and
a weight member arranged between the first coil spring and the second coil spring in a state of compressing the first coil spring and the second coil spring, the weight member including a first end portion supported on the first movable-side end turn portion, and a second end portion supported on the second movable-side end turn portion, and being moved in at least the width direction, the front-to-back direction, and the vertical direction of the seat back,
wherein a spring constant of each of the first coil spring and the second coil spring when the weight member moves in the front-to-back direction of the seat back is smaller than a spring constant derived when the weight member moves in the width direction and the vertical direction of the seat back.

10. The damping device of claim 9, wherein a dimension of the weight member in the front-to-back direction is smaller than a dimension of the weight member in the vertical direction.

11. The damping device of claim 10, further comprising a rotation stopping portion for preventing the weight member from rotating about the axis.

* * * * *